March 2, 1943.  H. J. REITER  2,312,443
SNAP FASTENER
Original Filed July 5, 1941

INVENTOR.
HAROLD J. REITER.
ATTORNEY

Patented Mar. 2, 1943

2,312,443

UNITED STATES PATENT OFFICE 2,312,443

SNAP FASTENER

Harold J. Reiter, Chicago, Ill.

Original application July 5, 1941, Serial No. 401,145. Divided and this application June 12, 1942, Serial No. 446,692

10 Claims. (Cl. 24—216)

This application is a division carved out of applicant's co-pending application Serial No. 401,145, filed July 5, 1941.

The invention relates to improvements in separable snap fastener installations and more particularly to structurally improved resilient socket elements.

The invention is concerned primarily with snap fastener socket elements having a reinforced stud receiving socket and associated piercing tangs for co-operative engagement and clinching in suitable attaching elements. The specific disclosures embrace structures embodying means to adequately reinforce the resilient stud engaging fingers of an expansible socket element against unwarranted flexing outwardly and to suitably protect said socket from being crushed or otherwise permanently distorted while in use; said means including integral piercing tangs for securing the element to the material on which it is installed.

It is, therefore, an object of the invention to provide a novelly constructed snap fastener socket element having a reinforced stud receiving socket.

Another object is to provide novelly constructed female snap fastener elements having protective reinforcing means including integral tangs arranged to pierce a sheet of material on which the elements are mounted; the tangs being positioned so as to be entirely concealed when the fastener elements are installed.

Another object is to provide a snap fastener installation of a type wherein complemental portions of the material to which the fastener elements are attached are spaced but a minimum distance apart when the elements are inter-engaged.

Another object is to provide a female snap fastener element having a semi-floating stud receiving socket and attached piercing tangs.

Another object is to provide a strong, efficient and inexpensively constructed snap fastener element embodying novel structural features facilitating ready and secure attachment.

The foregoing and such other object of the invention as will become more readily apparent as the description proceeds, will be more readily understood from a perusal of the following description; in which reference is had to the accompanying drawing, wherein.

Figure 1:
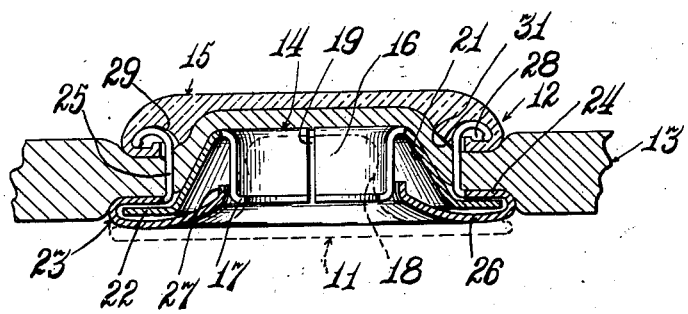
Fig. 1 is an enlarged longitudinal sectional view of one embodiment of a snap fastener socket installation showing the associated stud element in dotted lines.

Referring particularly to the snap fastener installation illustrated in Fig. 1, the complete commercial fastener includes male and female members 11 and 12. Said members are secured, respectively, to separate complemental portions of fabric, leather or other sheet metal material of the kind illustrated at 13 and are arranged to detachably interlock to hold said portions together.

Figure 2:
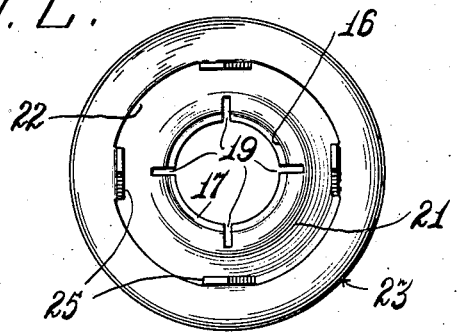
Fig. 2 is a top plane view of the socket element as shown in Fig. 1.

The socket member 12 best illustrated in Figs. 1 and 2, consists of a circular socket element 14 and an attaching element or cap 15. The socket element 14 preferably is formed from a thin circular sheet of metal having an inner cylindrical wall 16 formed on its lower free end, preferably with an internal flange or lip 17, to provide a restricted opening to receive the stud 18 of the associated male member 11 when the parts are matingly engaged. The inner cylindrical wall 16 and the internal lips 17 are suitably slit longitudinally, as at 19, at one or more points to define a plurality of resilient fingers adapted to yield outwardly when the stud is admitted or withdrawn therefrom. The upper end of the cylindrical wall merges with an external skirt preferably formed to define a downwardly and outwardly flared substantially conical breast portion 21 which terminates at or slightly below the plane of the flanged lower socket end in a substantially flat circular external flange 22.

An internally channelled ring 23 embraces the flange 22 and its upper wall 24 is provided on its inside circumferential edge with a plurality of integral piercing tangs 25 which extend upwardly substantially at right angles thereto. The lower wall 26 of the ring 23 may be flat but it preferably is curved, as shown, downwardly from the outer rolled edge thereof and then upwardly. In either event, its inner circumferential edge is disposed but a short distance from the resilient socket wall 16 and said inner edge may be rolled upwardly to provide a short cylindrical wall 27 having an inside diameter slightly larger than the outside diameter of the said socket wall 16.

It is preferable, but not essential, that the circular external flange 22 of the socket element be substantially less in material thickness than the spacing between the upper and lower walls 24 and 26 of the channelled ring 23 and that said ring have an internal diameter slightly larger than the diameter of the outer circumference of the circular flange 22. Provision of such clearances allows the socket element to shift slightly relative to the channelled ring 23 after the unit has been secured to the material, in a manner to be described hereinafter, so that the socket may readily align itself with the mating stud element.

It should be apparent at this time that the channelled ring 23 adequately protects and reinforces the circular flange 22 and provides a rounded edge on the socket element which does not readily tear the material on which it is installed and avoids personal injury frequently occuring when a raw metal edge is encountered. The downwardly and then upwardly curved lower wall 26 of the channel ring serves primarily to protect the resilient socket fingers against damage either from an outside pressure upon the face of the socket while laundrying or during insertion of the stud therein. The lower wall 26 further serves to guide a stud of the associated element into the socket should initial positioning be out of alignment. The cylindrical wall 27 on the inner circumferencial edge of the lower channel wall 26 adequately prevents unlimited outward flexing and permanent distortion of the fingers should the attached fastener elements, when matted, be subjected to lateral strain.

To mount the socket member, the socket element 14 is placed over one face of the sheet of material 13 with the stud receiving end of its socket disposed away from said material. The piercing tangs 25 then are forced through the material until the upper wall 24 of the ring 23 rests against the face thereof. The attaching element 15, which is shown as a molded plastic cap for the purpose of this illustration, is arranged in axial alignment with the socket element against the other face of the material 13 prior to the piercing operation. As shown in Fig. 1, one face of the attaching element 15 is annularly grooved and undercut as at 28. The inside wall 29 of the groove is gradually curved outwardly and downwardly to present an anvil surface which is contacted by the free ends of the tangs 25 when the latter are initially pressed downwardly thereagainst. Continued pressure causes the tangs to curl or roll outwardly radially along said anvil surface 29 and clinch in the undercut or circumferencial channel 28.

Although the mounting operation may be accomplished by hand, it preferably is effected by the use of a suitable power press to insure sufficient curling of the tangs within the channel 28. This prevents separation of the socket and attaching element and clamps the sheet of material securely therebetween. When the member is attached, the tangs are wholly concealed from view due to their being spaced inwardly from the rolled circumferential edge of the reinforced socket element.

It is apparent that the tangs 25 cannot first be driven through the material and then carefully fitted into the annular channel of the attaching element 15. Accordingly, the annular entrance slot 31, defined by the walls of the undercut 28, is considerably wider than the thickness of the metal forming the tangs. Consequently, whether the circle defined by the pointed ends of the circumferencially spaced tangs 25 is under or over size, said tangs will always pass freely through the annular slot and engage the anvil surface 29. It should be observed that the curvature of the said surface is substantially uniform throughout its width so as to cause the ends of the tangs always to contact an outwardly sloping surface and buckling of the tangs is avoided.

Figure 3:
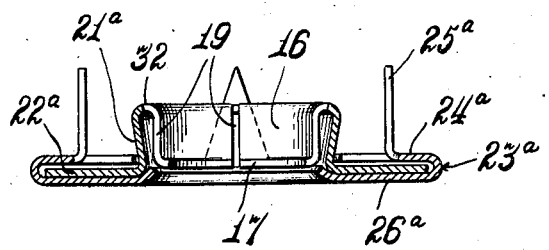
Fig. 3 is an enlarged longitudinal sectional view through a modified form of socket element having an attached socket guard provided with integral piercing tangs.

The socket element shown in Fig. 3 includes an inner circular piece of sheet material formed to provide an inner cylindrical wall 16 which may have an internal flange or lip 17 on its lower end and one or more longitudinal slits 19 therein to provide a plurality of resilient stud engaging fingers. An outer cylindrical reinforcing wall 21$^a$ is joined to the inner cylindrical wall at their upper ends by a fold 32. The wall 21$^a$ terminates substantially in the plane of the lower end of the resilient fingers at which terminus it merges into an external substantially flat circular flange 22$^a$ and because of its close proximity to the inner wall it serves to prevent unwarranted outward flexing of the resilient fingers.

An internally channelled ring 23$^a$, fitted over the circular flange 22$^a$, has one wall 26$^a$ underlying the the bottom face of said flange and terminating with its inner circumferencial margin rolled upwardly slightly so as to be disposed in closed proximity to the lower internally flanged end of the inner cylindrical wall 16. The other wall 24$^a$ of said ring overlies the top face of the circular flange 22$^a$ and may have its inner circumferencial edge disposed substantially in contact with the outer face of the outer cylindrical wall 21$^a$. A plurality of piercing tangs 25$^a$ are struck upwardly from and substantially at right angles to the channel wall 24$^a$ to provide attached means for securely installing the socket element on a piece of material.

The channelled ring 23$^a$, like the ring 23 on the device of Fig. 1, serves to reinforce the external socket flange 22a and provide a rolled circular edge as distinguished from the raw edge of flange 22$^a$. The lower wall 26$^a$ of said ring, which is disposed below the bottom plane of the resilient socket, adequately protects said socket from damage while in use or while being laundered. Clearly, the instant organizations provide snap fastener installations wherein the socket elements are substantially embedded in the material and are adequately reinforced to prevent distortion of any essential portion thereof. The relative thinness of the flat reinforced marginal edges of the socket elements tends to bring the complemental pieces of material closely together as distinguished from certain known types of fasteners having a large rolled edge to receive tangs carried by the attaching member.

Although exemplary forms of construction have been illustrated and described, it is to be understood that the disclosure is illustrative rather than restrictive and that the invention is not wholly limited to organizations having a resilient stud receiving socket, but is to embrace such variations as will fall within the spirit of the invention and the scope of the appended claims.

I claim:

1. A snap fastener socket element comprising, in combination, a cylindrical stud receiving expansible socket, a circular flange integral with and extending downwardly from the upper end of said socket and then outwardly so as to dispose its outer circumferencial margin substantially in the plane of the lower end of the socket, an internally channelled ring loosely embracing said circumferential margin, one wall of said ring being of sufficient width to dispose its inner circumferencial edge in close association with the lower end of the socket and limit socket expansion, and a plurality of piercing tangs integral with the other wall of said ring.

2. A snap fastener socket element comprising, in combination, a cylindrical stud receiving socket, a circular flange integral with and extending downwardly from the upper end of said socket and then outwardly so as to dispose its outer circumferencial margin substantially in the plane of the lower end of the socket, an internally channelled ring embracing said circumferencial margin, one wall of said ring being of sufficient width to dispose its inner circumferencial edge in close association with the lower end of the socket wall, and a plurality of piercing tangs integral with the other wall of said ring.

3. A snap fastener socket element comprising, in combination, a cylindrical stud receiving socket, a circular flange integral with and extending downwardly from the upper end of said socket and then outwardly so as to dispose its outer circumferencial margin substantially in the plane of the lower end of the socket, an internally channelled ring embracing said circumferencial margin, one wall of said ring being disposed below the plane of the lower end of said socket and being of sufficient width to dispose its inner circumferencial edge in close association with the lower end of the socket wall, and a plurality of piercing tangs integral with the other wall of said ring.

4. A snap fastener socket element comprising, in combination, a cylindrical stud receiving expansible socket, a circular flange integral with and extending downwardly from the upper end of said socket and then outwardly so as to dispose its outer circumferencial margin substantially in the plane of the lower end of the socket, an internally channelled ring embracing said circumferencial margin, one wall of said ring being disposed below the plane of the lower end of said socket and being of sufficient width to dispose its inner circumferencial edge in close association with the lower end of the socket and limit socket expansion, and a plurality of piercing tangs integral with the other wall of said ring.

5. A snap fastener socket element comprising, in combination, a cylindrical stud receiving expansible socket, a circular flange integral with and extending downwardly and outwardly from the upper end of and around said socket so as to dispose its outer circumferencial margin substantially in the plane of the lower end of the socket, an internally channelled ring loosely embracing said circumferencial margin, one wall of said ring being of sufficient width to dispose its inner circumferencial edge in close association with the lower end of the socket to limit socket expansion, and a plurality of piercing tangs integral with the other wall of said ring.

6. A snap fastener socket element comprising, in combination, a cylindrical stud receiving expansible socket, a circular flange integral with and extending downwardly and outwardly from the upper end of and around said socket so as to dispose its outer circumferencial margin substantially in the plane of the lower end of the socket, an internally channelled ring embracing said circumferencial margin, one wall of said ring being of sufficient width to dispose its inner circumferencial edge in close association with the lower end of the socket to limit socket expansion, and a plurality of piercing tangs integral with the other wall of said ring.

7. In a snap fastener socket element including a stud receiving socket and a surrounding flange, an internally channelled ring receiving the outer circumferencial margin of said flange in its channel, one wall of said ring being of sufficient breadth to locate its inner circumferencial edge in close proximity to the socket so as to reinforce the latter, and a plurality of piercing tangs integral with the free edge of and extending substantially at right angles to the other wall of said ring to provide means to attach the element to supporting material.

8. In a snap fastener socket element including a stud receiving socket and a surrounding flange, an internally channelled ring receiving the outer circumferencial margin of said flange in its channel, one wall of said ring being of sufficient breadth to locate its inner circumferencial edge in close proximity to the socket so as to reinforce the latter, and a plurality of piercing tangs integral with the free edge of the other wall of said ring to provide means to attach the element to supporting material.

9. In a snap fastener socket element including a stud receiving socket and a surrounding flange, an internally channelled ring receiving the outer circumferencial margin of said flange in its channel, one wall of said ring being of sufficient breadth to locate its inner circumferencial edge in close proximity to the socket so as to reinforce the latter, and a plurality of piercing tangs integral with said ring to provide means to attach the element to supporting material.

10. A snap fastener socket element comprising, in combination, a stud receiving resilient socket, a circular skirt integral with and extending outwardly and downwardly from one end of the socket, a ring having an annular internal channel arranged with said channel embracing the circumferencial edge of said skirt to dispose the bottom channel wall below the plane of said socket, and a plurality of piercing tangs integral with the inner edge of the top channel wall and extending upwardly substantially at right angles therefrom.

HAROLD J. REITER.